(12) United States Patent
Iwai

(10) Patent No.: US 10,130,055 B2
(45) Date of Patent: Nov. 20, 2018

(54) HIGH-SHELF HYDROPONIC CULTIVATION SYSTEM EQUIPPED WITH SOLAR PANEL

(71) Applicant: FARM LAND CO., LTD., Maebashi-shi, Gunma (JP)

(72) Inventor: Masayuki Iwai, Maebashi (JP)

(73) Assignee: FARM LAND CO., LTD., Maebashi-shi (JP)

( * ) Notice: Subject to any disclaimer, the term of this patent is extended or adjusted under 35 U.S.C. 154(b) by 176 days.

(21) Appl. No.: 14/909,487

(22) PCT Filed: Feb. 25, 2015

(86) PCT No.: PCT/JP2015/055321
§ 371 (c)(1),
(2) Date: Feb. 2, 2016

(87) PCT Pub. No.: WO2016/042796
PCT Pub. Date: Mar. 24, 2016

(65) Prior Publication Data
US 2016/0262323 A1 Sep. 15, 2016

(30) Foreign Application Priority Data
Sep. 16, 2014 (JP) .................................. 2014-187181

(51) Int. Cl.
*A01G 31/00* (2018.01)
*A01G 31/02* (2006.01)
(Continued)

(52) U.S. Cl.
CPC ............. *A01G 31/02* (2013.01); *A01G 7/045* (2013.01); *A01G 9/20* (2013.01); *H02S 20/23* (2014.12);
(Continued)

(58) Field of Classification Search
CPC .......... A01G 31/02; A01G 7/045; A01G 9/02; A01G 9/243; H02S 20/23
See application file for complete search history.

(56) References Cited

U.S. PATENT DOCUMENTS 7,162,833 B2 * 1/2007 Faris .................. A01G 13/0206
47/58.1 LS
8,186,100 B2 * 5/2012 Chuang .................. A01G 9/243
47/17
(Continued)

FOREIGN PATENT DOCUMENTS

JP 2000-300095 A 10/2000
JP 2002-26357 A 1/2002
(Continued)

OTHER PUBLICATIONS

International Search Report dated May 26, 2015, issued in counterpart International Application No. PCT/JP2015/055321 (2 pages).

*Primary Examiner* — Kristen C Hayes
(74) *Attorney, Agent, or Firm* — Westerman, Hattori, Daniels & Adrian, LLP

(57) ABSTRACT

[Problem] To provide a high-shelf hydroponic cultivation system equipped with a solar panel having a large power generation amount while ensuring light quantity for a plant. [Solution] Since the high-shelf hydroponic cultivation system 80 equipped with a solar panel has a light transmitting region A provided at the solar panel 50, more light can be taken into the frame unit and can be utilized for cultivating the plants P1 and P2. Since the double-sided light receiving solar cell 52 is employed for the solar panel 50 and light reflectivity is given to the floating bench 34, the weed-proof sheet 56, the vertical frame 20*b* and the like, light which does not shine on the plants P1 and P2 is reflected to a light receiving region on a rear face side of the double-sided light receiving solar cell 52 and can be effectively utilized for
(Continued)

power generation. Thus, a large power generation amount can be obtained while ensuring light quantity for the plants.

2 Claims, 4 Drawing Sheets

(51) Int. Cl.
*A01G 7/04* (2006.01)
*A01G 9/20* (2006.01)
*H02S 40/00* (2014.01)
*H02S 20/23* (2014.01)

(52) U.S. Cl.
CPC ............... *H02S 40/00* (2013.01); *Y02B 10/12* (2013.01); *Y02E 10/52* (2013.01); *Y02P 60/12* (2015.11); *Y02P 60/146* (2015.11); *Y02P 60/216* (2015.11)

(56) References Cited

U.S. PATENT DOCUMENTS

| | | | |
|---|---|---|---|
| 2010/0236164 A1* | 9/2010 | Chuang | A01G 9/243 52/173.3 |
| 2011/0005128 A1* | 1/2011 | Chuang | A01G 9/243 47/17 |
| 2016/0081282 A1* | 3/2016 | Salomon | E04B 7/12 136/248 |

FOREIGN PATENT DOCUMENTS

| | | |
|---|---|---|
| JP | 3167456 U | 4/2011 |
| JP | 2014-18082 A | 2/2014 |
| JP | 2014-97002 A | 5/2014 |
| JP | 2014-133552 A | 7/2014 |
| WO | 2012/043381 A1 | 4/2012 |

* cited by examiner

HIGH-SHELF HYDROPONIC CULTIVATION SYSTEM EQUIPPED WITH SOLAR PANEL

TECHNICAL FIELD

The present invention relates to a high-shelf hydroponic cultivation system equipped with a solar panel, wherein a plant is hydroponically cultivated under the solar panel.

BACKGROUND ART

In recent years, a growing interest in renewable energy has led to the widespread use of solar panels, which receives sunlight and generates electric power, to ordinary homes and ordinary businesses. Mega solar power plants wherein solar panels are disposed in a relatively large space are also built in many places. However, when a solar panel is placed on the ground, in many cases, the area under the solar panel is not utilized. Taking such a problem into consideration, an invention described in the following [Patent Literature 1] discloses a technique wherein an agricultural plant is cultivated on the ground under a solar panel.

However, there is a problem that the growing conditions of a plant depend on the weather, underground bacteria or the like in an open-field soil cultivation, and therefore fluctuation arises in the yield, quality or the like. There is another problem that an operator who performs agricultural work hurts his/her lower back in agricultural work on a low ground surface, and the productivity is low.

Taking into consideration such problems, the present inventors have made an invention relating to a high-shelf hydroponic cultivation system equipped with a solar panel whereby a plant can be stably cultivated under the solar panel [Japanese Patent Application No. 2014-133552].

CITATION LIST

Patent Literature

[Patent Literature 1] Japanese Published Unexamined Patent Application No. 2014-018082

SUMMARY OF INVENTION

Technical Problem

The above invention relating to a high-shelf hydroponic cultivation system equipped with a solar panel makes it possible to stably cultivate a plant under the solar panel. However, a larger light quantity is preferred in plant cultivation. When the area of a solar cell is decreased in order to secure a light quantity, however, there is a problem that the power generation amount lowers.

The present invention has been made in view of such a situation, and an object thereof is to provide a high-shelf hydroponic cultivation system equipped with a solar panel which has a large power generation amount while ensuring light quantity for a plant.

Solution to Problem (1) The present invention solves the above problem by providing a high-shelf hydroponic cultivation system 80 equipped with a solar panel, comprising: a solar panel 50, which generates electric power when receiving light; a frame unit configured to support the solar panel 50 at a specific angle; a cultivation tank 30, which is placed under the solar panel 50 at a specific height from the ground surface and is used for hydroponically cultivating a specific plant; and a floating bench 34, which floats on nutrient solution in the cultivation tank 30 and holds the plant, characterized in that the solar panel 50 has: a panel substrate unit 54 having light transmissivity; and a plurality of double-sided light receiving solar cells 52, which are arranged at the panel substrate unit 54 with a specific gap and are provided with power generation regions at both faces.

(2) The present invention solves the above problem by providing the high-shelf hydroponic cultivation system 80 equipped with a solar panel described in (1) above, characterized in that the floating bench 34 has light reflectivity and reflects light, which is transmitted through a light transmitting region A of the panel substrate unit 54, toward a light receiving region on a rear face side of the double-sided light receiving solar cell 52.

(3) The present invention solves the above problem by providing the high-shelf hydroponic cultivation system 80 equipped with a solar panel described in (1) or (2) above, characterized by comprising a weed-proof sheet 56 having light reflectivity on the ground, wherein the weed-proof sheet 56 reflects light, which is transmitted through the light transmitting region A of the panel substrate unit 54, toward a light receiving region on a rear face side of the double-sided light receiving solar cell 52.

(4) The present invention solves the above problem by providing the high-shelf hydroponic cultivation system 80 equipped with a solar panel described in (3) above, characterized in that the frame unit has light reflectivity, and reflects light, which is transmitted through the light transmitting region A of the panel substrate unit 54, to a plant side and reflects light, which is reflected at the floating bench 34 or the weed-proof sheet 56, toward a light receiving region on a rear face side of the double-sided light receiving solar cell 52.

Advantageous Effect of Invention

Since a high-shelf hydroponic cultivation system equipped with a solar panel according to the present invention has a light transmitting region provided at a solar panel, more light can be taken into the frame unit and utilized for plant cultivation. Moreover, since a double-sided light receiving solar cell is employed for a solar panel and light reflectivity is given to the floating bench, the weed-proof sheet, the vertical frame and the like, light which does not shine on a plant is reflected to a light receiving region on a rear face side of the double-sided light receiving solar cell and can be effectively utilized for power generation. Thus, a large power generation amount can be obtained while light quantity for a plant is ensured.

DESCRIPTION OF EMBODIMENT

Figure 1:
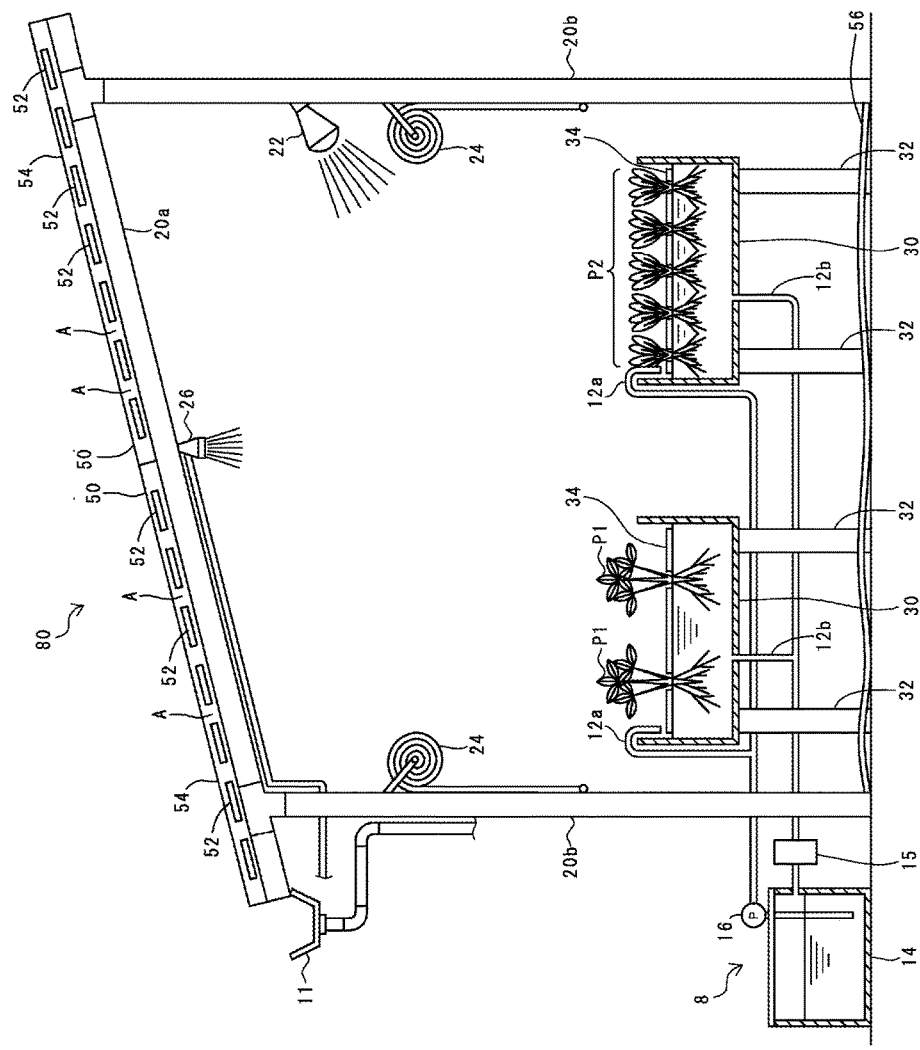
FIG. 1 A view for illustrating a high-shelf hydroponic cultivation system equipped with a solar panel according to the present invention.

An embodiment of a high-shelf hydroponic cultivation system 80 equipped with a solar panel according to the present invention will be described hereinafter based on the drawings. A high-shelf hydroponic cultivation system 80 equipped with a solar panel according to the present invention illustrated in FIG. 1 is provided with: a solar panel 50, which generates electric power when receiving light; a transverse frame 20a configured to hold the solar panel 50 at a specific angle; a vertical frame 20b configured to support the transverse frame 20a; a cultivation tank 30, which is placed under the solar panel 50, that is, in a frame unit composed of the transverse frame 20a and the vertical frame 20b; and a floating bench 34, which floats on nutrient solution in the cultivation tank 30 and holds plants P1 and P2.

Figure 2:
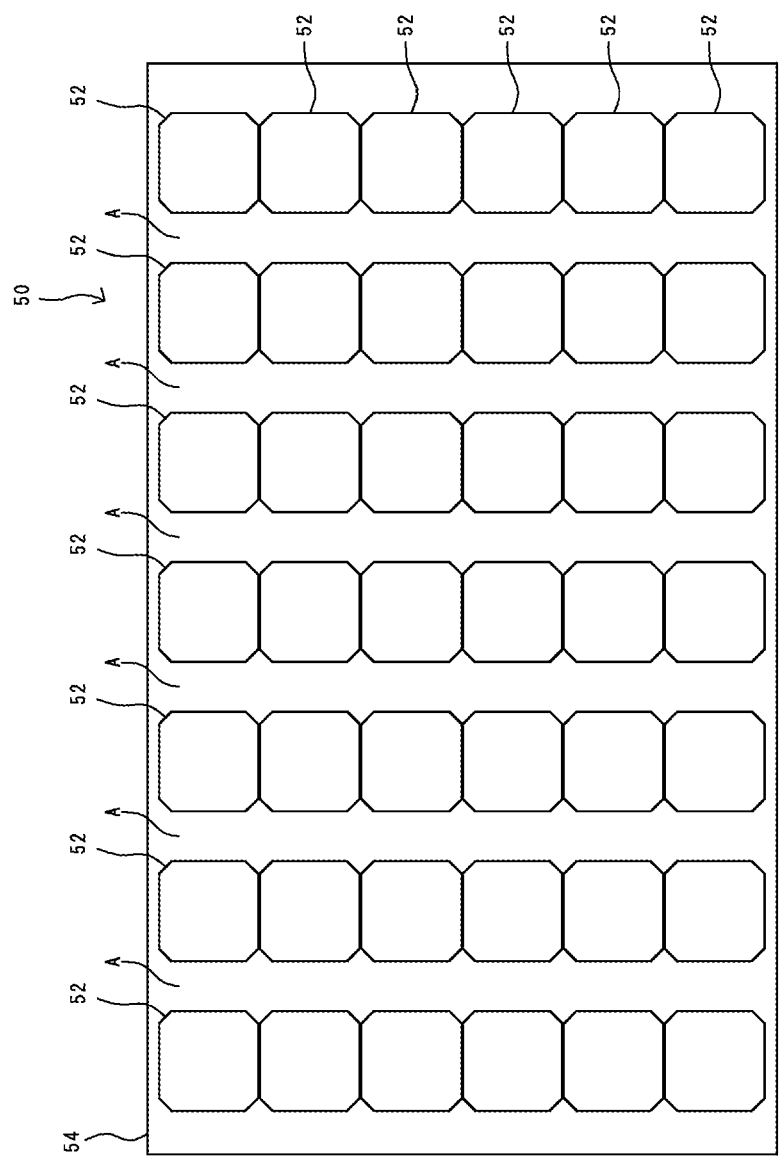
FIG. 2 A view for illustrating a solar panel of a high-shelf hydroponic cultivation system equipped with a solar panel according to the present invention.

Moreover, as illustrated in FIG. 2, the solar panel 50 has: a panel substrate unit 54 having light transmissivity such as glass; and a well-known double-sided light receiving solar cell 52, which is provided inside the panel substrate unit 54 and is provided with power generation regions at both faces. In addition, a plurality of double-sided light receiving solar cells 52 are arranged in the panel substrate unit 54 with a specific gap, and gaps between the double-sided light receiving solar cells 52 form a light transmitting region A of the panel substrate unit 54. Although FIG. 2 illustrates an example wherein six double-sided light receiving solar cells 52 are disposed adjacent to each other in the vertical direction in the figure and seven rows are arranged with a gap in the horizontal direction in the figure, it is to be noted that the arrangement of the solar panels 50 is not limited to such an example and may be any other arrangement. Moreover, the gaps between the double-sided light receiving solar cells 52, that is, the light transmitting region A of the panel substrate unit 54 may be provided in the horizontal direction, or may be provided in both the vertical direction and the horizontal direction of the double-sided light receiving solar cells 52.

The transverse frame 20a configured to hold the solar panel 50 is generally faced south and is fixed at an angle whereby the solar panel 50 is irradiated most efficiently with sunlight. It is to be noted that the surfaces of the transverse frame 20a and the vertical frame 20b are preferably coated with white paint or the like having light reflectivity, or the surfaces of the transverse frame 20a and the vertical frame 20b to be used preferably have metallic luster. Moreover, gaps between the solar panels 50 are closed, so as to prevent infiltration of rainwater or the like from a gap between the solar panels 50 into the frame unit. Furthermore, a rain gutter 11 is preferably placed at the transverse frame 20a, so as to guide rainwater or the like flowing on the solar panel 50 toward a specific catch drain or the like. With such a structure, rainwater flowing on the solar panel 50 does not drip onto the ground, and therefore mud splattering or the like caused by such dripping can be prevented.

Moreover, the cultivation tank 30 of the high-shelf hydroponic cultivation system 80 equipped with a solar panel is supplied with nutrient solution suitable for plant cultivation, so that plants P1 and P2 are hydroponically cultivated in the cultivation tank 30. In addition, a floating bench 34 which floats on nutrient solution in the cultivation tank 30 and holds the plants P1 and P2 is used as a method for holding the plants P1 and P2 in the high-shelf hydroponic cultivation system 80 equipped with a solar panel of this application. The floating bench 34 has light reflectivity at least on a front face side. As the floating bench 34 having light reflectivity, for example, a floating bench 34 itself may be formed of a white synthetic resin plate or the like having light reflectivity, or a front face side of a floating bench 34 may be coated with white paint or the like having light reflectivity, a synthetic resin film, a synthetic resin plate, a metal thin film or the like. It is to be noted that it is particularly preferable in terms of work efficiency that cultivation holes provided at the floating bench 34 so as to hold the plants P1 and P2 are formed in two rows or five rows.

Moreover, the cultivation tank 30 is provided with a leg unit 32, so that the cultivation tank 30 is placed at a specific height. The height of the cultivation tank 30 is preferably set so that the liquid level of the nutrient solution is at approximately 70 cm to 85 cm from the ground. Since the cultivation tank 30 is placed at such a height, the operator can perform agricultural work without bending down, and therefore a burden in agricultural work can be reduced and the productivity of the agricultural plant can be increased.

Moreover, in the high-shelf hydroponic cultivation system 80 equipped with a solar panel according to the present invention, a weed-proof sheet 56 configured to hinder growth of weeds is preferably laid on the ground. In addition, the weed-proof sheet 56 is preferably constituted of a sheet made of a white material or the like having light reflectivity, a sheet having a color or a metal thin film with light reflectivity or the like, so that the weed-proof sheet 56 has light reflectivity at least on a front face side.

Moreover, supply of the nutrient solution to the cultivation tank 30 is preferably achieved by a circulation type nutrient solution supply device 8 illustrated in FIG. 1, for example. The circulation type nutrient solution supply device 8 is provided with: a nutrient solution tank 14 configured to store nutrient solution; a nutrient solution supply pipe 12a configured to supply nutrient solution in the nutrient solution tank 14 to the cultivation tank 30; a solution feeding pump 16 configured to feed the nutrient solution stored in the nutrient solution tank 14 via the nutrient solution supply pipe 12a to the cultivation tank 30; a drain pipe 12b configured to return the nutrient solution, which has been supplied to the cultivation tank 30, to the nutrient solution tank 14; and a filter 15 configured to filter nutrient solution returning to the nutrient solution tank 14. The nutrient solution tank 14 stores nutrient solution containing a specific concentration of a specific fertilizer component, and operation of the solution feeding pump 16 supplies nutrient solution to the cultivation tank 30 and returns nutrient solution through the drain pipe 12b to the nutrient solution tank 14. It is preferable that the nutrient solution tank 14 collectively stores nutrient solution of an amount corresponding to a cultivating period of the plants P1 and P2 to be cultivated in the cultivation tank 30, so that the nutrient solution is circulated for a specific cultivating period (approximately one month). With such a structure, returned nutrient solution can be reused, and therefore fertilizer or water can be saved, costs can be reduced, and an environmental burden can be reduced.

Moreover, a cover unit 24 which has light transmissivity and can be freely opened and closed is placed at all side faces of the frame unit. A windable and transparent sheet made of synthetic resin is preferably used as the cover unit 24. However, the cover unit 24 is not limited to such a sheet, and a glass plate, a door or the like which can be opened and closed may be used. By suitably opening or closing the cover unit 24 depending on the weather, the temperature or the like, a side face of the frame unit is put into an opened state, a closed state or a half-opened state. Thus, infiltration of rainwater into the frame unit can be prevented by closing the cover unit 24 in rainy weather, for example. Moreover, damage by strong winds can be prevented. Moreover, the temperature in the frame unit can be adjusted by putting the cover unit 24 into an opened state, a closed state or a half-opened state depending on the outdoor temperature. Thus, the growth environment of the plants P1 and P2 in the frame unit can be managed to a certain extent. Moreover, the working environment of the operator can be improved.

Furthermore, a mist device 26 configured to atomize and spray water may be provided at the transverse frame 20a. It is to be noted that a water supply pipe to the mist device 26 may be placed along the transverse frame 20a, or may be placed through the transverse frame 20a. With such a structure, the temperature in the frame unit can be lowered by evaporation of mist. Moreover, the humidity in the frame unit can be raised. Thus, the growth environment of the plants P1 and P2 in the frame unit can be further managed, and the working environment of the operator can be improved.

In a section of the frame unit inevitably having an insufficient received light quantity, it is to be noted that an auxiliary lamp 22 may be placed over the cultivation tank 30 of the section as needed, so that the auxiliary lamp 22 compensates for shortage of light quantity. It is to be noted that a well-known lighting lamp such as an LED lamp or a fluorescent lamp can be used as the auxiliary lamp 22. Moreover, the cultivation tank 30 may be divided into a plurality of sections depending on the received light quantity in the frame unit, and plants to be cultivated may be varied depending on the received light quantities at the sections. With such a structure, an appropriate plant can be selected and cultivated depending on the received light quantity of the cultivation tank 30, and therefore efficient agricultural plant cultivation can be achieved.

Figure 3:
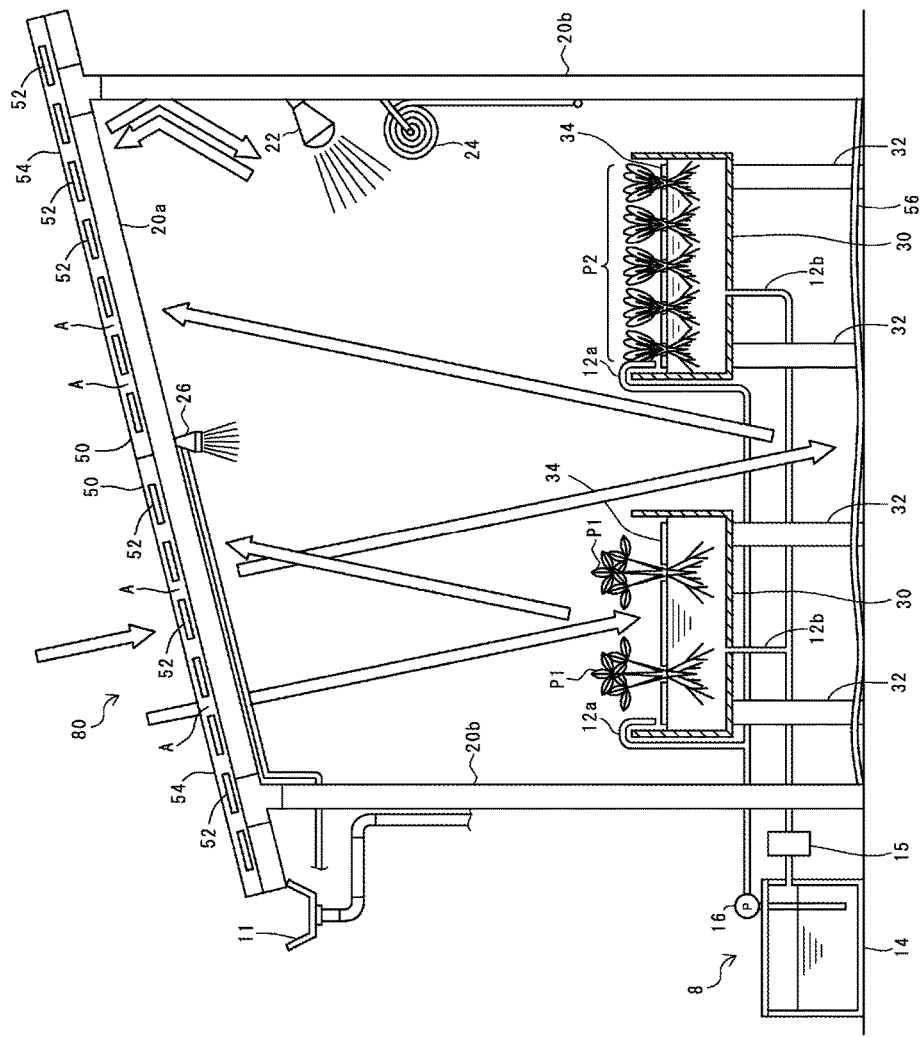
FIG. 3 A schematic view for illustrating the light travelling direction in a high-shelf hydroponic cultivation system equipped with a solar panel according to the present invention.

Next, the light travelling direction in the high-shelf hydroponic cultivation system 80 equipped with a solar panel will be described using the schematic view of FIG. 3. It is to be noted that the void arrows in FIG. 3 represent the light travelling direction. First, when sunlight shines on the solar panel 50, the light receiving region on a front face side of the double-sided light receiving solar cell 52 generates and outputs electric power. The output electric power is sold or supplied to power demand via a power feed/transmission system which is not illustrated in the drawings.

Moreover, sunlight which shines on the light transmitting region A of the panel substrate unit 54 is transmitted through the light transmitting region A and taken into the frame unit. Sunlight taken into the frame unit shines on the plants P1 and P2 and is used for cultivating the plants P1 and P2. Moreover, some of sunlight taken into the frame unit that does not shine on the plants P1 and P2 is reflected toward a rear face side of the double-sided light receiving solar cell 52 by the floating bench 34 or the weed-proof sheet 56 which has light reflectivity. The floating bench 34 or the weed-proof sheet 56 also reflects light, which enters from a side face or the like of the high-shelf hydroponic cultivation system 80 equipped with a solar panel, or light from the auxiliary lamp 22 toward a rear face side of the double-sided light receiving solar cell 52. Furthermore, the vertical frame 20b having light reflectivity reflects light transmitted through the light transmitting region A or the like to a plant P1, P2 side, and also reflects light, which is reflected at the floating bench 34 or the weed-proof sheet 56, toward a rear face side of the double-sided light receiving solar cell 52. In addition, the light receiving region on a rear face side of the double-sided light receiving solar cell 52 generates and outputs electric power when receiving such reflected light. The output electric power is sold or supplied to power demand via the above power feed/transmission system.

As described above, since the high-shelf hydroponic cultivation system 80 equipped with a solar panel according to the present invention has the light transmitting region A provided at the solar panel 50, more light can be taken into the frame unit and utilized for cultivating the plants P1 and P2. Moreover, since the double-sided light receiving solar cell 52 is employed for the solar panel 50 and light reflectivity is given to the floating bench 34, the weed-proof sheet 56, the vertical frame 20b and the like, light which does not shine on the plants P1 and P2 is reflected to a light receiving region on a rear face side of the double-sided light receiving solar cell 52 and can be effectively utilized for power generation. This compensates for a decrease in the area of the solar cell caused by forming the light transmitting region A, and therefore a large power generation amount can be obtained while ensuring light quantity for plants.

Figure 4:
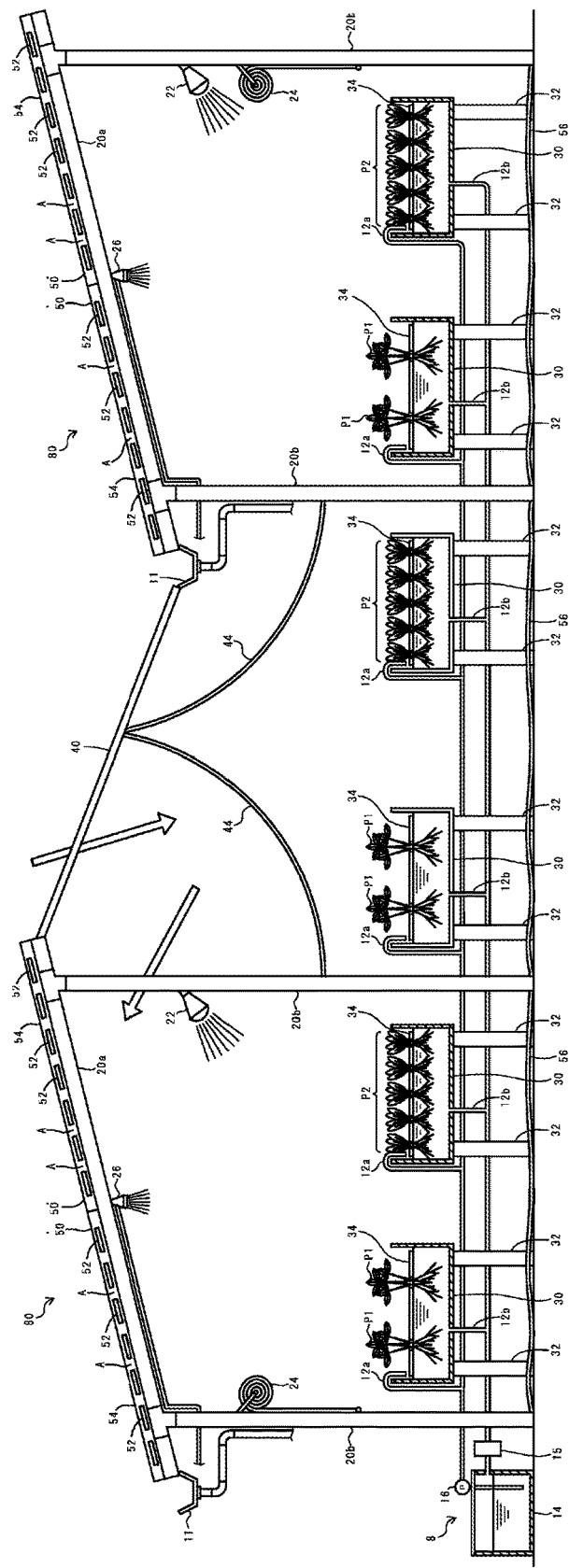
FIG. 4 A view for illustrating another example of a high-shelf hydroponic cultivation system equipped with a solar panel according to the present invention.

It is to be noted that a light transmissive roof member 40 such as a fluorine film may be provided at a roof part between ridges of the high-shelf hydroponic cultivation system 80 equipped with a solar panel and a reflection sheet 44 having light reflectivity may be placed as illustrated in FIG. 4, so that light which shines into a space between ridges shines on a light receiving region on a rear face side of the double-sided light receiving solar cell 52 as represented by the void arrows in FIG. 4. With such a structure, light which shines into a space between ridges can also be effectively utilized for power generation, and therefore a larger power generation amount can be obtained.

In addition, the farmer can obtain income from sales of electric power generated by the solar panel 10 or the like in addition to income from sales of the plants P1 and P2 cultivated in the cultivation tank 30. Thus, the income of the farmer can be increased.

It is to be noted that the shapes, structures and dimensions of the respective parts of the high-shelf hydroponic cultivation system 80 equipped with a solar panel, the cultivated plants and the like illustrated in this example are only exemplary, and the present invention can be modified and implemented without departing from the gist of the invention.

REFERENCE SIGNS LIST 20a transverse frame
20b vertical frame
30 cultivation tank
34 floating bench
50 solar panel
52 double-sided light receiving solar cell
54 panel substrate unit
56 weed-proof sheet
80 high-shelf hydroponic cultivation system equipped with solar panel
A light transmitting region

The invention claimed is:

1. A shelf hydroponic cultivation system equipped with a solar panel, comprising:
   a solar panel, which generates electric power when receiving light;
   a plurality of frame units configured to support the solar panel at an angle, the plurality of frame units comprising a transverse frame configured to hold the solar panel and a vertical frame configured to support the transverse frame, the traverse frame being faced south of the solar panel;
a cultivation tank, which is placed under the solar panel at a specific height from the ground surface and is used for hydroponically cultivating a plant; and
a floating bench, which floats on nutrient solution in the cultivation tank, wherein
the solar panel has a panel substrate unit having light transmissivity, and a plurality of double-sided light receiving solar cells, which are arranged at the panel substrate unit and are provided with power generation regions at both faces,
a weed-proof sheet having light reflectivity is provided on the ground and reflects light, which is transmitted through a light transmitting region of the panel substrate unit, toward a light receiving region on a rear face side of the double-sided light receiving solar cell, and
the specific height is a height where a liquid level of a nutrient solution supplied to the cultivation tank is at 70 cm to 85 cm from the ground surface.

2. The shelf hydroponic cultivation system equipped with a solar panel according to claim 1, wherein
the floating bench has light reflectivity and reflects light, which is transmitted through the light transmitting region of the panel substrate unit, toward the light receiving region on a rear face side of the double-sided light receiving solar cell, and
the plurality of frame units have light reflectivity, and reflect light, which is transmitted through the light transmitting region of the panel substrate unit, to a plant side and reflect light, which is reflected at the floating bench or the weed-proof sheet, toward the light receiving region on a rear face side of the double-sided light receiving solar cell.

\* \* \* \* \*